(12) United States Patent
Friestad et al.

(10) Patent No.: US 7,571,688 B1
(45) Date of Patent: Aug. 11, 2009

(54) INTEGRATED CLUTCHES FOR A SEEDING MACHINE

(75) Inventors: Michael E. Friestad, Rock Island, IL (US); Keith L. Felton, Colona, IL (US); Kevin W. Hoehn, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/062,158

(22) Filed: Apr. 3, 2008

(51) Int. Cl.
*A01B 33/00* (2006.01)
*A01B 35/00* (2006.01)
*A01C 15/00* (2006.01)
*F16D 13/52* (2006.01)
*F16D 13/58* (2006.01)

(52) U.S. Cl. ............... 111/200; 111/921; 111/922; 192/70.19; 192/70.16; 74/13; 172/105

(58) Field of Classification Search .......... 111/200, 111/173, 921, 922; 192/70.19, 70.16, 70.11, 192/66.1, 30 R; 74/13; 172/105
See application file for complete search history.

(56) References Cited

U.S. PATENT DOCUMENTS

| | | | | |
|---|---|---|---|---|
| 2,725,006 A | * | 11/1955 | Richmond | ............... 172/44 |
| 2,801,833 A | * | 8/1957 | Huge | ............... 366/47 |
| 4,779,471 A | * | 10/1988 | Rettig | ............... 74/13 |
| 5,003,894 A | | 4/1991 | Lafferty | |
| 5,078,066 A | | 1/1992 | Lafferty | |
| 6,240,861 B1 | | 6/2001 | Memory | |
| 7,104,339 B2 | * | 9/2006 | Garner | ............... 172/311 |
| 7,152,541 B2 | | 12/2006 | Ptacek | |
| 7,273,016 B2 | * | 9/2007 | Landphair et al. | ............... 111/185 |
| 7,374,029 B1 | * | 5/2008 | Dillman | ............... 192/30 R |
| 2002/0178981 A1 | * | 12/2002 | Drummond et al. | ............... 111/903 |

* cited by examiner

*Primary Examiner*—Christopher J. Novosad
(74) *Attorney, Agent, or Firm*—Taylor & Aust, P.C.

(57) ABSTRACT

A seeding machine having a plurality of seed meters receiving rotary input from a common input shaft. First and second gearboxes respectively connect the common rotary input to individual seed meters. A flexible drive extends from the gearbox adjacent the common rotary input to the seed meters. Spring clutches, normally connected, are electrically actuated to disengage the drive to the individual seed meters. The clutches may be integrated in the gearbox adjacent the rotary drive or the gear box for the individual seed meters.

17 Claims, 3 Drawing Sheets

INTEGRATED CLUTCHES FOR A SEEDING MACHINE

FIELD OF THE INVENTION

The present invention relates to seeding machines, and more particularly to the drives for such machines.

BACKGROUND OF THE INVENTION

An agricultural seeding machine, such as a row crop planter or grain drill, places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed disks. In the case of a seed disk metering system, a seed disk is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disk to assist in movement of the seeds into the seed cells. The seeds are singulated and discharged at a predetermined rate to the seed placement system.

The seed placement system may be categorized as a gravity drop system or a power drop system. In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing.

In the agricultural field, growers are ever looking for ways to increase productivity by accurate placement of seeds in the ground. One way to attempt to achieve this goal is to have interruption of seed distribution at individual seed meters rather than from a common drive. This eliminates variations caused by slack in the mechanical system used to drive the individual seed meters from a common rotary drive. A number of devices have been proposed to individually start and stop seed meters. However, these are add-on units that increase bulk and complexity of the seeding machine. Furthermore there is a problem in fitting the devices to a range of seeding machinery without undue complication.

What is needed, therefore, in the art is a mechanism for individually controlling operation of seed meters without substantial added bulk to the system.

SUMMARY OF THE INVENTION

The invention includes a seeding machine having a common rotary drive and a plurality of seed meters for metering seeds based on a rotary input. Flexible drive shafts extend from the common rotary drive to individual seed meters. First gearboxes connect the common rotary drive to the flexible drive shafts and second gearboxes connect the flexible drive shafts to the seed meters. Clutches for selectively connecting the common rotary drive to the seed meters are integrated into one of the first and second gearboxes for each seed meter.

DETAILED DESCRIPTION OF THE INVENTION

Figure 1:
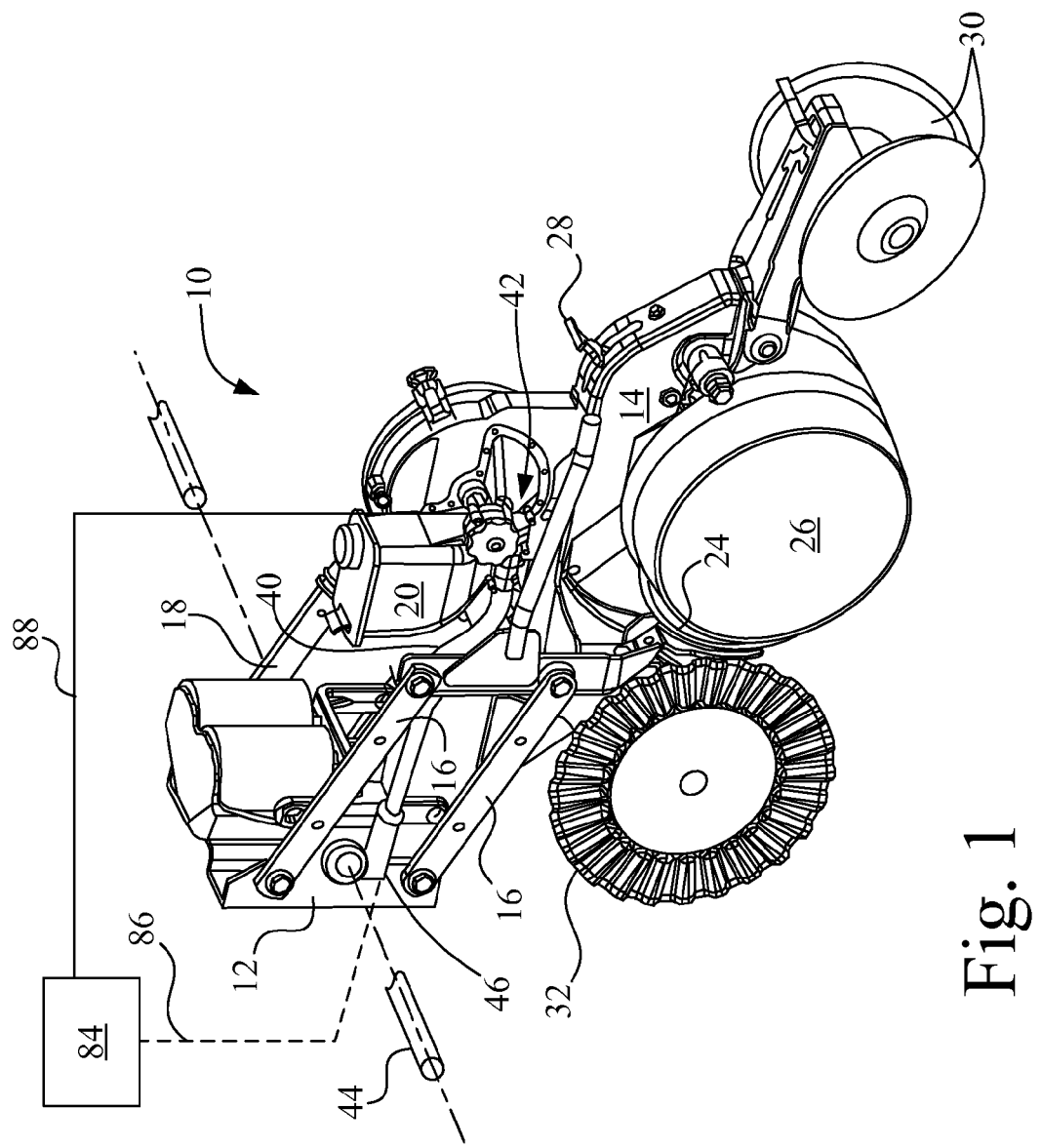
FIG. 1 is a perspective view of a seeding machine in accordance with the present invention.

Referring to FIG. 1, there is shown a seeding machine 10 that is one of a number of seeding machines, only one of which is shown to simplify the discussion of the present invention.

The seeding machine 10 includes an individual row crop planting unit that is mounted to a transverse toolbar, not shown, by U-bolts that engage a mounting plate 12. The planting unit is provided with a frame 14 that is coupled to the mounting plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through seed hose 18 to an auxiliary hopper 20 mounted on frame 14. Seed in the auxiliary hopper 20 is metered by a seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 32. A forward mounted coulter 30 is used for slicing through crop residue before it encounters the furrow opener 24.

The seed meter 22 is driven by a flexible rotatable drive shaft 40 that drives second gear box 42. The flexible and rotatable drive shaft 40 may be of a type manufactured and marketed by Elliott Manufacturing Company, LLC of Binghamton, N.Y. A ground driven common rotary drive, in the form of a hexagonal cross-section bar 44, provides a rotational input to the flexible drive shaft 40 through a first gearbox 46 for each seeding machine 10. In this way, the ground speed of the seeding machine 10 controls the speed of the seed meter 22. The flexible rotatable drive shaft 40 includes a flexible outer sheath and a rotatable inner core. The ends of the flexible rotatable drive shaft are coupled to the respective first and second gearboxes 46 and 42.

Figure 2:
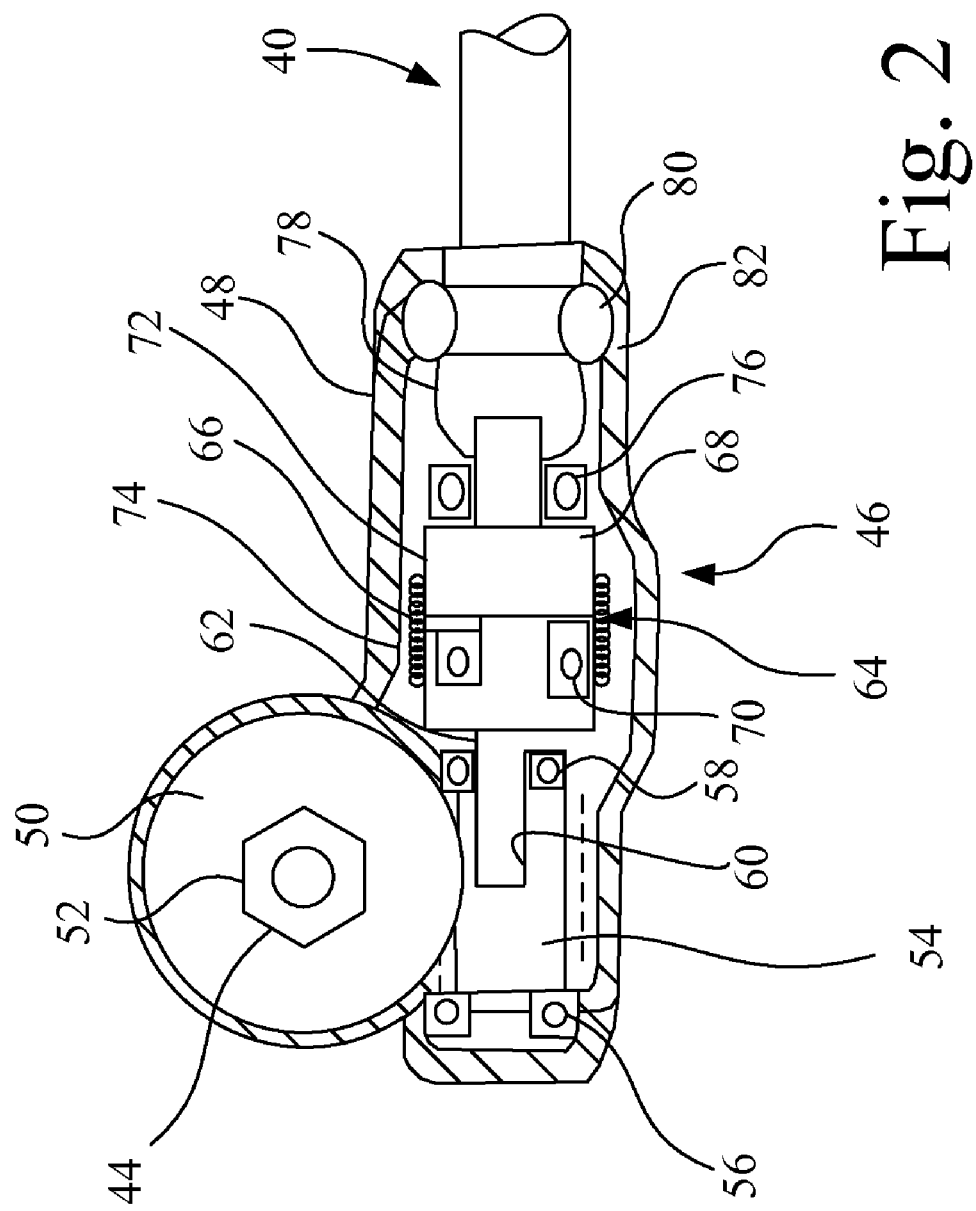
FIG. 2 is an enlarged sectional view of a first gearbox used in the seeding machine of FIG. 1.
Figure 3:
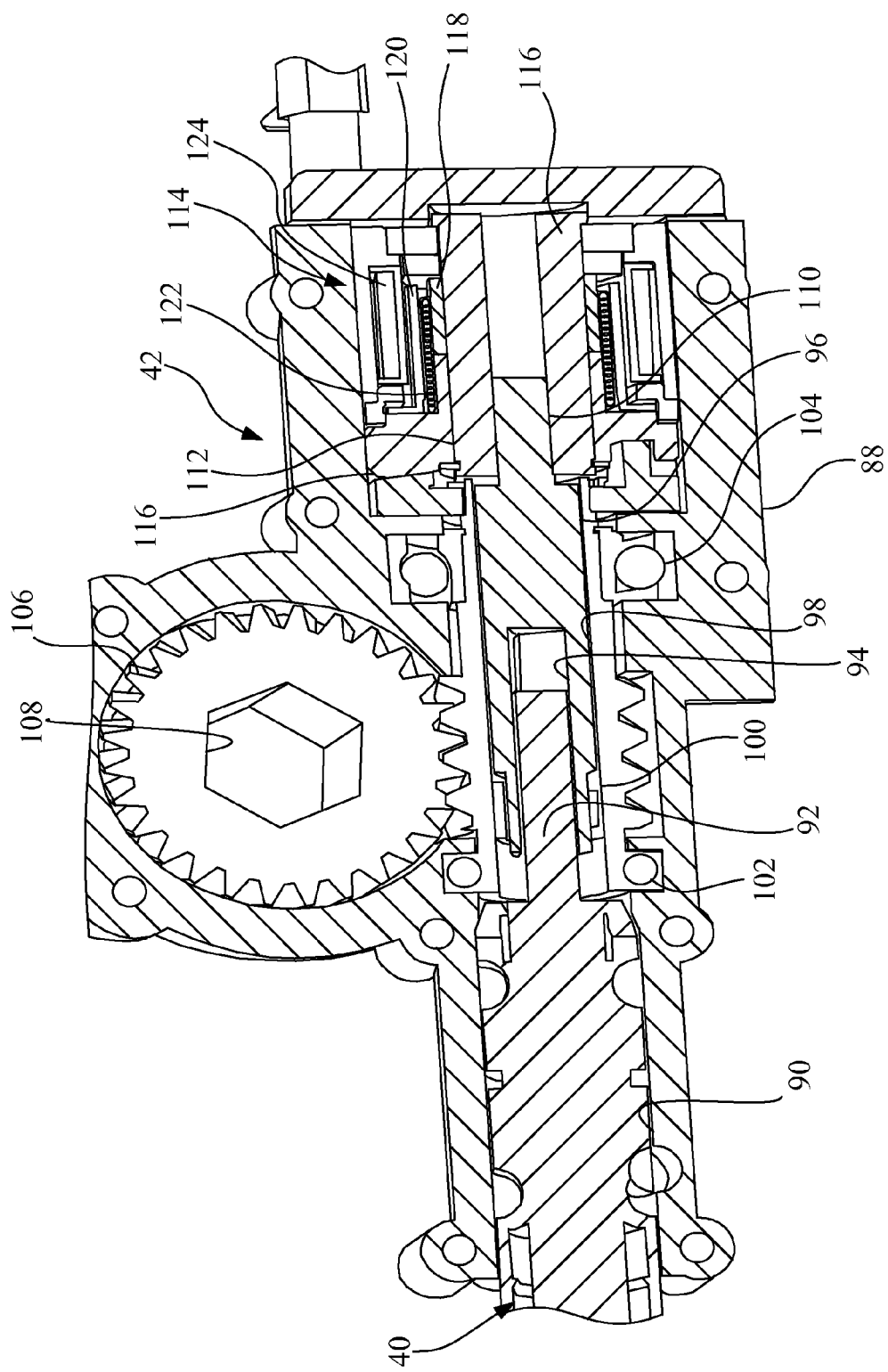
FIG. 3 is an enlarged sectional view of a second gearbox used in the seeding machine of FIG. 1.

In accordance with the present invention, clutch assemblies shown in detail in FIGS. 2 and 3 are integrated in one of the first and second gear boxes 46 and 42, respectively to individually and selectively connect seed meters 22 to the common rotary drive shaft 44.

Referring to FIG. 2, first gear box 46 includes a housing 48 that has an input gear 50 with a hexagonal opening 52 receiving common drive 44. Appropriate mechanisms for sealing the gearbox housing 48 are provided but are not shown to enable a better understanding of the present invention. Gear 50 is a helical gear that meshes with a corresponding driven helical gear 54 journaled in housing 48 by bearings 56 and 58, respectively. Driven helical gear 54 has an appropriate recess 60 that receives a corresponding protrusion 62 of a spring clutch assembly 64 to drivingly connect driven helical gear and spring clutch assemble 64. The protrusion 62 connects to an input element 66 journaled with respect to an output element 68 by a coaxial bearing assembly 70. A spring element 72 may be setup to be affixed to element 66 to spin with that element. Spring element 72 is adapted to selectively engage or disengage output element 68 responsive to movement generated by a coil 74 receiving an external electrical input. Preferably spring element 72 is arranged to couple the input 66 in output elements 68 in the absence of a signal into decouple these elements with an electrical signal to coil 74. It should be apparent to those skilled in the art however, that the spring element 72 may alternatively be affixed to the output element and/or may be actuated to connect the input and output elements when a signal is present.

Output element 68 is journaled by bearing assembly 76 in housing 48 and connects with a first end 78 of flexible drive shaft 40 through an appropriate driving interconnection. A ferrule 80 is received in an annular groove 82 to hold the end of flexible shaft 40 in place.

It should be noted that the clutch assembly 64 is fully integrated into gearbox 46 so that it adds no substantial radial dimension to the gear box 46 and adds only a minimal axial extension to the gearbox. The clutch assembly 64 may be actuated from a control device 84 which responds either to operator input or to a GPS signal and is directed to coil 74 via a signal line 86 shown in dashed lines in FIG. 1. The provision of the clutch 64 in gearbox 46 enables an individual connection or disconnection at the planter to minimize any additional seeds being placed on the ground.

FIG. 2 shows one of the alternatives for incorporating the clutch assemblies in the gearboxes and FIG. 3 shows the arrangement wherein the clutch is in gearbox 42. Gearbox 42 has housing 88 which receives flexible drive shaft 40 through an appropriate input bore 90 and appropriate retention means (not shown). The end of flexible drive shaft 40 has a driving connection 92 which is received in a corresponding driven recess 94 of a shaft 96. Shaft 96 is received in a bore 98 of a helical drive gear 100 journaled by bearing assemblies 102 and 104. Shaft 96 is journaled with respect to helical gear 100 by an appropriate arrangement. Input helical gear 100 meshes with a driven gear 106 appropriately journaled within housing 88 and having a driving output recess shown as a hexagonal bore 108. Bore 108 connects with the input to the seed meter 22, not shown to enable a better focus on the invention.

The right end of shaft 96, as shown in FIG. 3 has a driving input connection 110 received in a driven input recess 112 for a spring clutch, generally indicated by 114. Spring clutch 114 has an annular input element 116, appropriately journaled within housing 88. A sleeve element 118 is affixed to input element 116 and receives a spring clutch element 120. Spring clutch element 120 rotates with input shaft 96 and is positioned over an annular output element 122 which is connected by a flexible joint 116 to the helical gear 100. An electromagnetic coil 124 is positioned to actuate spring element 120 to disengage coupling between element 118 and output element 122 when an electrical signal is applied to coil 124.

The positioning of the clutch assembly 114 opposite the flexible drive 40, but within the housing 88 for gearbox 42, enables an extremely compact and integrated incorporation of individual clutches for the seed metering machine. The same alternative arrangements for the components of the spring clutch assembly 64 may be employed for the spring clutch 114. Furthermore, the electrical signal to coil 124 may come from control device 84 via line 126, and may be operator generated or dependent upon a GPS signal.

Having described the preferred embodiment, it will become apparent that various modifications can be made without departing from the scope of the invention as defined in the accompanying claims.

The invention claimed is:

1. A seeding machine comprising:
   a common rotary drive;
   a plurality of seed meters for metering seeds based on a rotary input,
   flexible drive shafts extending from said common rotary drive to individual seed meters;
   first gearboxes connecting said common rotary drive to said flexible drive shafts and second gearboxes connecting said flexible drive shafts to said seed meters; and
   clutches for selectively connecting said common rotary drive to said seed meters, a clutch being integrated into one of said first and second gearboxes for each seed meter, the gearbox containing said clutch having a helical gear and said clutch is operatively connected between said helical gear and said flexible drive shaft.

2. A seeding machine as claimed in claim 1, wherein said clutch is a spring clutch.

3. A seeding machine as claimed in claim 1, wherein said clutch is integrated into said first gearbox.

4. A seeding machine as claimed in claim 1, wherein said clutch is integrated into said second gearbox.

5. A seeding machine as claimed in claim 1, wherein said clutch is normally on and activated to be disengaged.

6. A seeding machine as claimed in claim 5, wherein said clutch is electromagnetic and activated by an electrical signal.

7. A seeding machine as claimed in claim 6, wherein said electromagnetic clutch is actuated by one of a GPS and an operator signal.

8. A seeding machine as claimed in claim 1, wherein said second gearbox has the helical gear drive for said seed meter and said clutch is positioned between the input to said helical gear and said flexible drive shaft.

9. A seeding machine as claimed in claim 1, wherein said helical gear is in said second gearbox and the input to said helical gear is between said clutch and said flexible drive shaft input.

10. A seeding machine as claimed in claim 9, having an adapter shaft which is concentric with the input to said helical drive gear and journaled relative thereto.

11. A seeding machine as claimed in claim 10, wherein the input to said clutch is through said adapter shaft and the output from said clutch is the input to said helical gear.

12. A seeding machine as claimed in claim 11, wherein said clutch is a spring clutch.

13. A seeding machine as claimed in claim 12, wherein said clutch is electromagnetically actuated.

14. A seeding machine as claimed in claim 13, wherein said clutch is normally connected and actuated to be disconnected.

15. A seeding machine as claimed in claim 14, wherein said clutch is electromagnetically actuated and actuated by a signal.

16. A seeding machine as claimed in claim 15, wherein said signal is one of a GPS signal and an operator signal.

17. A seeding machine as claimed in claim 11, further comprising bearings on the input shaft of said helical gear for journaling thereof.

* * * * *